(12) United States Patent
Ott

(10) Patent No.: US 7,414,755 B2
(45) Date of Patent: Aug. 19, 2008

(54) COLOR QUALITY ASSESSMENT AND COLOR CONTROL DURING COLOR REPRODUCTION

(75) Inventor: Hans Ott, deceased, late of Regensdorf (CH); by Anna Ott-Heizmann, legal representative, Regensdorf (CH); by Beatrice-Michaela Hintermuller-Ott, legal representative, Neftenbach (CH); by Markus Hans Ott, legal representative, Danikon (CH)

(73) Assignee: X-Rite Europe AG, Regensdorf (CH)

( * ) Notice: Subject to any disclaimer, the term of this patent is extended or adjusted under 35 U.S.C. 154(b) by 780 days.

(21) Appl. No.: 10/970,753

(22) Filed: Oct. 21, 2004

(65) Prior Publication Data

US 2005/0105111 A1 May 19, 2005

(30) Foreign Application Priority Data

Oct. 23, 2003 (EP) ................................. 03024427

(51) Int. Cl.
*G06F 15/00* (2006.01)
*G03F 3/08* (2006.01)
*H04N 1/46* (2006.01)
*G06K 9/00* (2006.01)

(52) U.S. Cl. ........................ 358/1.9; 358/518; 358/504; 358/515; 382/162; 382/167

(58) Field of Classification Search ................. 358/1.9, 358/518, 504, 515; 382/162, 167
See application file for complete search history.

(56) References Cited

U.S. PATENT DOCUMENTS

| 4,649,502 | A | 3/1987 | Keller et al. |
| 4,975,862 | A | 12/1990 | Keller et al. |
| 5,182,721 | A | 1/1993 | Kipphan et al. |
| 5,957,049 | A | 9/1999 | Ammeter et al. |
| 6,041,708 | A | 3/2000 | Kipphan et al. |
| 6,736,478 | B2 * | 5/2004 | Franzke et al. ................. 347/19 |
| 2002/0104457 | A1 | 8/2002 | Brydges et al. |
| 2004/0012801 | A1 * | 1/2004 | Murakami ................... 358/1.9 |

\* cited by examiner

*Primary Examiner*—David Moore
*Assistant Examiner*—Charlotte M. Baker
(74) *Attorney, Agent, or Firm*—McCarter & English, LLP

(57) ABSTRACT

A process for color quality assessment and color control in a color printing process is provided. The process utilizes a test element array including several test elements is co-reproduced with an image to be reproduced, whereby for the pixels of the image and the test elements of the test element array, color co-ordinate data are present in an original color space and for the test elements of the test element array the color values are present in an assessment color space are present. The co-reproduced test element array is colorimetrically measured with respect to the assessment color space, color difference of the test elements relative to the corresponding set color values are determined from the measured color values of the color elements and a color quality measure is calculated for the reproduced image and/or color correction quantities are calculated for the color reproduction process. The original color space (AFR) is divided into a larger number of color space areas. A sensitivity matrix is determined for each color space area, which for the underlying color reproduction process in the region of the respective color space area describes the connection between incremental changes of the color correction adjustments of the color reproduction process and thereby in the color reproduction effected color changes with respect to the assessment color space. The color correction quantities required for the color correction are calculated by way of the sensitivity matrixes of the color space areas from the determined color differences of the color elements and the color space weights of the color elements with the condition that the absolute value of the sum of the after execution of the color correction remaining color differences of all color elements of the test element array weighted with the color space weights becomes minimal. The color correction defined by the color correction quantities determined in this manner is then carried out in the color reproduction process.

29 Claims, 2 Drawing Sheets

COLOR QUALITY ASSESSMENT AND COLOR CONTROL DURING COLOR REPRODUCTION

FIELD OF THE INVENTION

The invention relates to a process for the assessment of the color quality in a color reproduction process and a process for the color control in a color reproduction process. The invention relates especially to the color quality assessment and color control in a color printing process, especially in offset printing.

BACKGROUND ART

A process for the quality assessment and color control in the offset printing known, for example, from U.S. Pat. No. 5,182,721 and U.S. Pat. No. 6,041,708 consists in that a color measuring strip is printed together with the actual image, which includes a number of defined color control elements with known set values. The color values of the co-printed color control elements are measured and compared with the matching set values. The color differences determined thereby serve as a measure of quality and are also used for the control of the inking in the printing machine, whereby the control is carried out such that the total color difference is minimized. This minimization of the total color difference is thereby limited to the printed colors in the color measuring strip. However, those colors are not always representative of the relevant colors of the image motive so that the achieved color quality of the print is in many cases not optimal.

A further developed process, generally referred to as in-image-measurement and, for example, described in U.S. Pat. No. 5,957,049, is based on that the printed image itself is colorimetrically measured and used for the quality assessment and color control. The printed image is thereby scanned with a local image resolution of, for example, 1 mm * 1 mm. This takes place, for example, in an image scanner or in an electronic camera. The measured data (color values of the individual pixels) are compared with the corresponding measured data of a reference print or with the image data from the printing precursor. The color differences produced thereby again serve as quality measure and/or for the control of the inking, whereby the mean color error is minimized over the whole printed image. This process is technically very laborious and computing time intensive, whereby a special problem is the locally exact overlapping of the reference image data with the measured data of the printed image to be tested.

SUMMARY OF THE INVENTION

It is therefore a significant object of the present invention to improve a generic color quality assessment process and a generic color control process in such a way that a result is achieved which is of equal quality or at least approximates that of the in-image- measurement, but requires a significantly smaller technological and computing effort compared to this known process.

This general object underlying the invention is achieved with a color quality assessment or color control process in which a test element array including several test elements is co-reproduced with an image to be reproduced, whereby for the pixels of the image and the test elements of the test element array, color co-ordinate data in an original color space and for the test elements of the test element array said color values in an assessment color space are present. Furthermore, the co-reproduced test element array, according to a beneficial feature of the invention, is colorimetrically measured with respect to the assessment color space. Color differences of the test elements relative to corresponding set color values are determined from their measured color values and a color quality measure is calculated for the reproduced image from the color differences of the test elements, whereby the originating color space (AFR) is divided into a larger number of color space areas ($FRB_i$) each of which is defined by the color co-ordinate values of its center. A test element array (FT) with a number of color elements ($FE_i$) corresponding to the number of color space areas ($FRB_i$) is advantageously used, whereby the color co-ordinate values of the color elements correspond to the color co-ordinate values of the centers of the color space areas. At least for a selected part of the pixels of the image (B) that color space area ($FRB_i$) per pixel (P) is determined as matching the center of which in the originating color space (AFR) has the smallest distance from the respective pixel (P). For the selected part of the pixel of the image a weighing portion ($G_{pi}$) is determined per pixel (P) for the selected part of the pixels of the image and assigned to the respectively associated color space area ($FRB_i$) and for each color space area ($FRB_i$) the thereto assigned weighing portions ($G_{pi}$) of the pixels (P) are summed up to a color space weight ($G_i$). The color differences ($dL^*_i$, $da^*_i$, $db^*_i$) of the color elements ($FE_i$) determined on the test element array with respect to the assessment color space (BFR) relative to the set color values are weighed respectively with the color space weight ($G_i$) of that color space area (FRB) the center color co-ordinate values of which correspond to the color co-ordinate values of the respective color element ($FE_i$) and as color quality measure ($Q_L$, $Q_a$, $Q_b$), the sum of the so weighted color differences ($dL_{iw}$, $da_{iw}$, $db_{iw}$) is calculated for the reproduced image over all color elements ($FE_i$) of the test element array (FT) The general object underlying the invention is also achieved with a color quality assessment or color control process in which a test element array including several test elements is co-reproduced together with an image to be reproduced, whereby for the pixels of the image and the test elements of the test element array, co-ordinate values are present in an originating color space and for the test elements of the test element array the color values are present in an assessment color space. Furthermore, the color reproduced test element array, according to an advantageous feature of the invention, is colorimetrically measured with regard to the assessment color space. Color differences of the test elements relative to the corresponding set color values is determined from their measured color values and color correction quantities for the color reproduction process are calculated from the color differences of the test elements, whereby the originating color space (APR) is divided into a larger number of color space areas ($FRB_i$) each of which is defined by the color co-ordinate values of a center. A test element array (FT) with a number of color elements ($FE_i$) corresponding to the number of color space areas ($FRB_i$) is used, whereby the color co-ordinate values of the color elements correspond to the color co-ordinate values of the centers of the color space area. At least for a select part of the pixels of the image (B) per pixel (P) that color space region ($FRB_i$) is determined as matching. the center of which has the smallest distance from the respective pixel (P) in the originating color space (AFR). For the selected part of the pixels of the image, a weighing portion ($G_{pi}$) is set per pixel (P) and assigned to the respectively matching color space area ($FRB_i$) and for each color space area ($FRB_i$) the weighing portions ($G_{pi}$) of the pixels (P) assigned thereto are summed up to a color space weight ($G_i$). A sensitivity matrix [$S_i$] is determined for each color space area ($FRB_i$) which for the underlying color reproduction process in the region of the respective color space area ($FRB_i$) describes the connection between incremental changes of the color correction adjustments of the color reproduction process and thereby in the color reproduction effected color changes with respect to the assessment color space (BFR). The color correction quantities ((dD)) are calculated by way of the sensitivity matrixes ($[S_i]$) of the color space areas ($FRB_i$) from the determined color differences (($dF_i$)) of the color elements ($FE_i$) and the color space weights ($G_i$) of the color elements ($FE_i$) with the proviso that the absolute value of the sum of the after execution of the color correction remaining color differences of all color elements of the test element array weighted with the color space weights becomes minimal and the color correction defined by the color correction quantities ((dD)) determined in this manner is carried out in the color reproduction process.

Additional advantageous aspects and features associated with the invention of the present disclosure will be readily apparent to persons skilled in the pertinent art from the detailed description which follows, particularly when reviewed together with the figures appended hereto.

DETAILED DESCRIPTION OF THE PREFERRED EMBODIMENT

Figure 1:
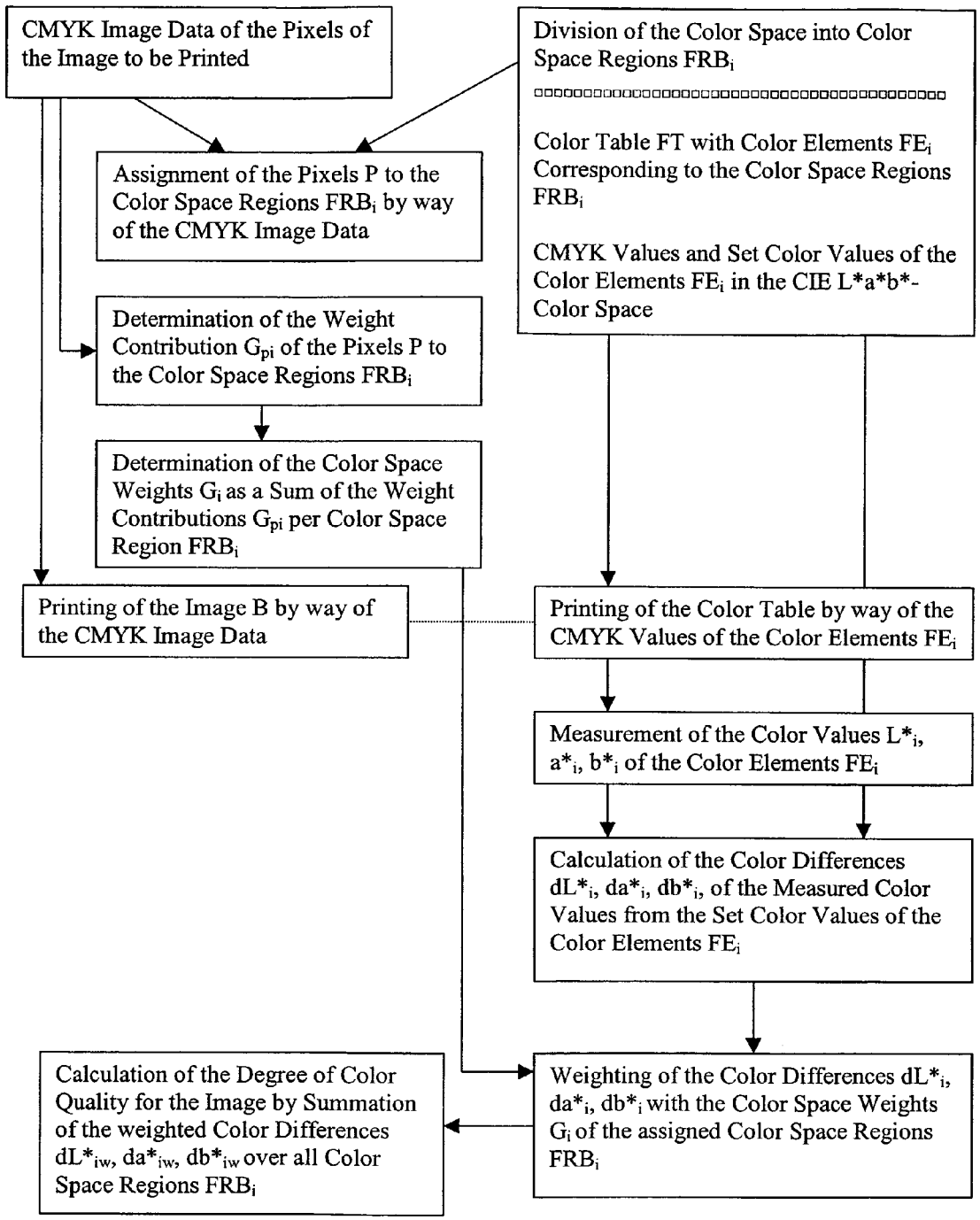
FIG. 1 is a principal block diagram of an exemplary embodiment of the color quality assessment process in accordance with the invention.
Figure 2:
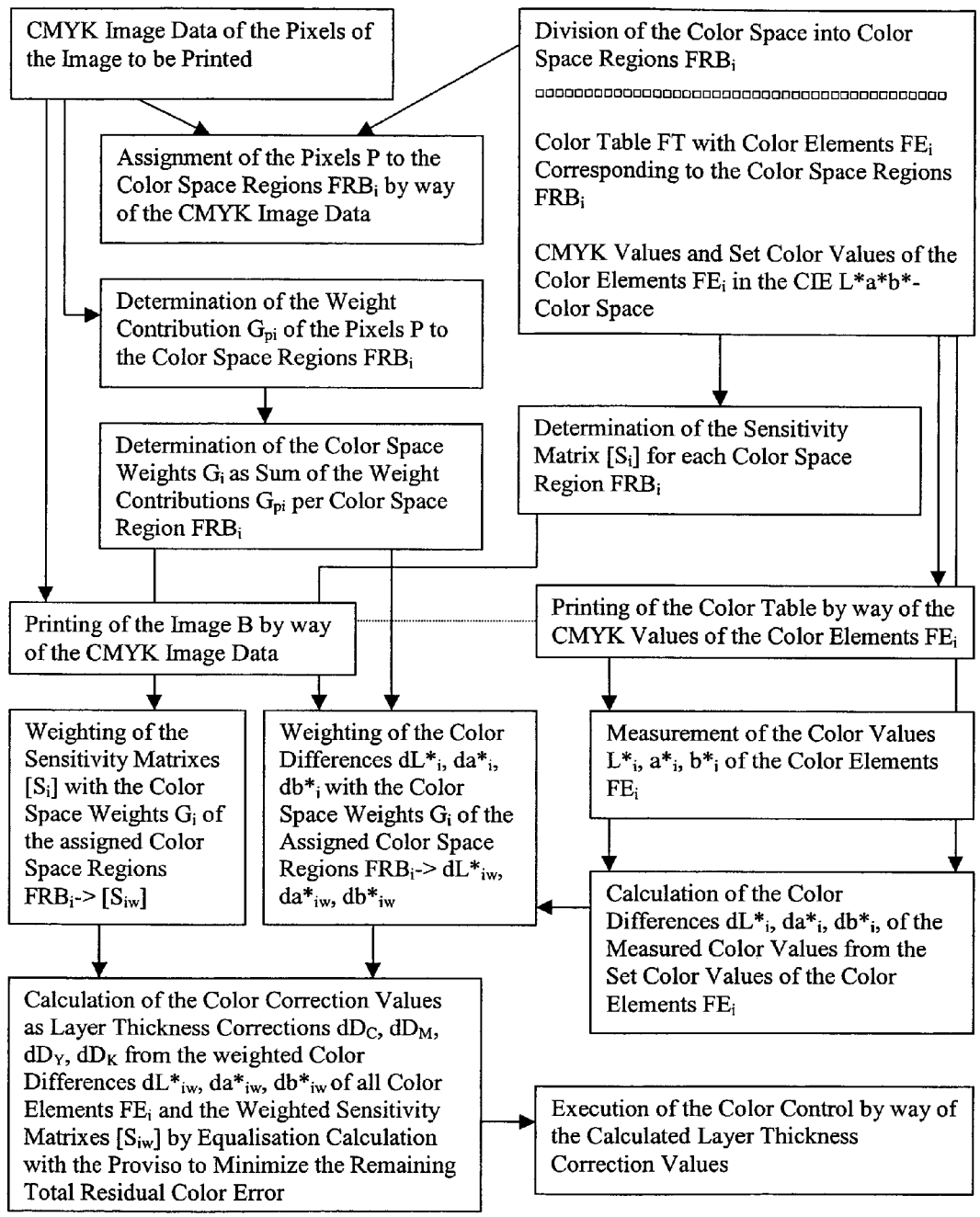
FIG. 2 is a principal block diagram of an exemplary embodiment of the color control process in accordance with the invention.

The abbreviations and terms of the art used in the following description and the claims are understood to have the following meaning:

| | |
|---|---|
| CIE: | Commission Internationale de l'Eclairage |
| ISO: | International Standards Organisation |
| ICC: | International Color Consortium |
| ANSI: | American National Standards Institute |
| CGATS: | Committee for Graphic Arts Technologies Standards |

RGB-Color Space: For example the color space used for the color representation on a screen and for electronic cameras. R-G-B-(Red, Green, Blue)-filter characteristics are used.

CIE-L*a*b*-Color Space: Perceived equidistant color space according to CIE.

CIE-X-Y-Z-Color Space: Basis for the CIE-L*a*b*-Color Space.

C-M-Y-K-Color Space: Four dimensional color space which in four color printing is defined by the surface coverage (raster percentage values) of the four printing colors Cyan (C), Magenta (M), Yellow (Y) and Black (K).

Densitometric color space: For the measurement of the optical color densities. Standardized filter characteristics, for example of ISO, are used.

Initial Color Space: The color space underlying the respective reproduction process, in the four color printing typically the C-M-Y-K-Color Space.

Assessment Color Space: Color space suitable for the visual (and metrological) color assessment, generally the CIE-L*a*b*-Color Space.

Offset Printing: The tonal data are produced by rastering. The surface coverage of the point by point rastering of the individual colors is 0 to 100%. Mixed colors are produced by overprinting of the colors involved.

Four Color Printing: All colors are produced by the four scale colors Cyan (C), Magenta (M), Yellow (Y) and Black (K).

Multicolor and Special Color Printing: The colors are produced by an arbitrary number of scale colors and special colors. They can also be printed one onto the other.

Printing Control Elements: Evenly printed surface elements with the dimensions of, for example, 5 mm*5 mm, which are suitable for visual color comparison and for the color measurement with commercial densitometries, three range color measurement apparatus or spectrally measuring color measurement apparatus. Typical printing control elements are:

Full Tone Measurement Element: A color with 100% surface coverage. Overprint of two or three colored inks with respectively 100% surface coverage.

Raster-Measurement Element: A color with, for example, 40% or 80% surface coverage.

Gray Balance-Element: Overprinting of Cyan, Magenta and Yellow with respectively about 40% surface coverage.

Color Measuring Strip, Printing Control Strip: Strip shaped (linear) arrangements of several printing control elements.

Image: Graphic representation of any size of one or more images (motives) and graphic elements, which are qualatively captured as a whole and the colors of which are to be optimally reproduced. In the offset printing, this corresponds to the content of the printing plates.

Color Elements: Homogenously colored surface elements with the dimensions, for example, 5 mm*5 mm, which are suited for the visual or colorimetric color comparison.

Test Elements: Generic term for printing control elements and color elements.

Color Table: Generally two dimensional arrangement of different color elements. The number of the color elements is about 100 to 1000. A color table should include in sufficiently fine graduation all important colors determining the image. There are also standardized color tables, for example, from ANSI:IT8.7/3 or ISO:12642.

Test Element Array: Generic term for color measuring strips, printing control strips and color tables. Includes both strip shaped (one dimensional) as well as two dimensional arrays of different test elements, including mixtures of printing control elements and color elements.

ICC Profile: Interpolation tables which, for example, describe the relationship between CMYK-Raster Data and CIE-L*a*b*-Color Values for the whole color space. The data format is standardized by ICC.

Color Space Transformation: Color values can be calculated from one color space into another color space by way of the ICC profiles, for example, from the CMYK Color Space into the CIE-L*a*b*-Color Space and from that, for example, into the RGB-Color Space.

Color Measuring Strips Scanner: Mechanically moved measurement apparatus, for example, a densitometer or spectrophotometer, for the measurement of the printing control elements of a color measuring strip.

Color Table Scanner: Mechanically movable measurement apparatus, for example, a densitometer or spectrophotometer, for the measuring of the color elements of a color table.

Image Scanner: Mechanically movable measurement apparatus, for example, a RGB-Measurement Apparatus, densitometer or spectrophotometer, for the measurement of all image elements (pixel) with a defined local image resolution. The measurement can be carried out with RGB or densitometric spectral characteristic or spectrally.

RGB-Camera: Electronic camera with spectral RGB-characteristic. It produces RGB measurement values for each image pixel according to its local resolution.

Spectral Camera: Electronic camera with spectral characteristic, for example, 16 spectral ranges with 20 nm band width each, which cover the wave length range of 400 nm to 700 nm. It produces spectral measured data for each pixel according to its local resolution, from which the color measured data can be calculated for any color space.

Color Space Region: Part or sub-region of a color space.

The present invention is described by way of the following example of offset color printing. However, as will be readily apparent to those skilled in the pertinent art from the present disclosure, the invention is not limited to the offset printing, but can be accordingly also used for other color printing processes (for example ink jet) or in general for color reproduction processes.

It is a core point of the present invention that a test element array FT is co-printed (or generally co-reproduced) together with the image B, which as test elements does not or not only include the typical printing control elements of a classical printing control strip, but a multitude of, for example, 256 different color elements $FE_i$, which cover the complete printable color space or at least the most important colors in the image B. All color measurements required for the color quality assessment or the color control are then carried out on the color elements $FE_i$ of this element array, no measuring taking place in the actual image B.

Thus far, the invention resembles the first, above mentioned known process which operates with a printing control strip, whereby, however, the mentioned more extensive test element array is co-printed instead of a classical printing control strip. Compared to this known process, a significant quality improvement is thereby achieved at comparatively very little additional effort.

In order to now reach results comparatively as good as in the also above mentioned method of the in-image-measurement, even without measurements in the actual printed image, a weighing of the color differences measured at the individual color elements $FE_i$ of the test element array is carried out according to a further core aspect of the invention. This weighing takes into account the importance of the individual tonal data (colors) occurring in the image B and in a way projects the color composition of the image B into the test element array FT.

The invention presupposes that image data in the form of color co-ordinate data of the starting color space AFR, here the CMYK-Color Space, are present for the image B actuality to be printed. These CMYK image data were produced, for example, in the printing precursor step as a base for the manufacture of the printing plates. (In another printing process, these data can be present in the form of co-ordinates of another starting color space adapted to the printing process).

The CMYK image data lie in the CMYK color space. In a first step, the whole CMYK color space is now divided into a number of CMYK color space regions $FRB_i$, which are defined by the CMYK values of their respective centers. The color elements $FE_i$ of the test element array are thereby set so that their CMYK values lie in their respective center of the individual colors space regions. The division of the CMYK color space consists therefore defacto in the selection of a test element array (sufficiently covering the CMYK color space). It is further presupposed for the invention that for the selected test element array or their color elements $FE_i$ the underlying CMYK values and the associated color set data with respect to an assessment color space BFR are known. Typically, the CIE-L*a*b*-color space is used as the assessment color space BFR and the color set values are therefore L*a*b*-color values. The set color values can be determined in a generally known manner, for example, by color measurement of a reference print. Alternatively, the CIE-L*a*b*-color set values can also be calculated by way of a color space transformation of the underlying CMYK values to the CIE-L*a*b*-color values, which transformation corresponds to the printing process. This is also principally known and therefore does not require any further discussion. For practical reasons, each color space region $FRB_i$ or each color element $FE_i$ of the test element array is associated with an Index i.

Subsequently, the respectively matching CMYK-color space region is determined for all (or selected) pixels P of the image. This can be carried out, for example, in that the absolute distance of the CMYK-values of a pixel characterized by an Index P from the centers of the color space regions defined by the color elements of the test element array is determined and the pixel is assigned to that color space region to which center the pixel has the smallest absolute distance (in the CMYK color space). Thus, the assignment of the pixels to the color space regions de facto results in the assignment of the pixels to the color elements of the test element array.

The absolute distance of a pixel P from the center of a color space region $FRB_i$, which is also referred to as geometric raster distance GTVD, is calculated as follows:

$$GTVD_{pi} = ((C_p - C_i)^2 + (M_p - M_i)^2 + (Y_p - Y_i)^2 (K_p - K_i)^2)^{0.5} \quad \text{(Formula 1)}$$

Wherein p is the index of the respective pixel and i the index of the respective color space region or the corresponding color element in the test element array. C, M, Y and K are the raster data of the pixel P or the color element $FE_i$.

The geometric raster deviation must be small enough so that changes of the tonal value (printed surface coverage) or changes of the color layer thickness cause approximately the same color data changes (CIE-dL*, da*, db*) for all pixels or their CMYK values, which are associated with the same color space region. In other words, a sufficient number of color space regions are required so that in each color space region the color differences are sufficiently linear to these changes. These requirements are similar to those for ICC Profiles. Therefore, the IT8.7/3-Color Table definitions with 928 different raster value combinations can also be used, for example.

For the quality assessment or color correction, the color differences only need to be known at a limited precision, for example, 10%. Therefore, a test element array with only, for example, 256 color elements (CMYK raster value combinations) can also be used. For this test element array, the color elements can consists, for example, of all raster value combinations with 12.5%, 37.5%, 62.5% and 87.5% of all four printing colors, Cyan, Magenta, Yellow and Black. The sub-region of the IT8.7/3-Color Table with only 128 raster value combinations can also be used.

A weighing process occurs in the next step in which each color space region $FRB_i$ or each color element $FE_i$ of the test element array is assigned an individual color space weight $G_i$ according to criteria to be further described, whereby these color space weights are preferably, but not necessarily standardized to one (sum of all color space weights=1). The individual color space weights are in the following also referred to more briefly as weights, for reasons of simplicity.

It is the general goal of this weighing process to influence the subsequent steps of the color quality assessment or the color control of the printing process based on the color present in the actual image to be printed, whereby the color composition of the image is in a way projected into the test element array, so that all measurements can be limited to the test element array and no measurements in the image itself are necessary. A result comparable to an in-image-measurement is thereby achieved but the technological or computing effort necessary therefor is significantly smaller than in this known process.

The weighing process or the determination and assignment of the individual weights to the individual color elements of the test element array can be carried out depending on a desired criterium fully automatically and/or on the basis of user input. It also depends on whether the final goal is a color quality assessment or a color control; the criteria for those two applications need not necessarily be the same.

For example, all pixels of the image to be printed can be used in connection with the color quality assessment. For each pixel P which (according to the above description) falls into an individual color space region $FRB_i$, the weight $G_i$ of the corresponding color space region or color element of the test element array is increased by a predetermined weight amount $G_{pi}$. The more pixels are associated with a color space region, the more weight is assigned to this color space region (raster data combination) or the associated color element of the test element array for the error assessment. The weights thereby correspond to a (quantified) frequency distribution of the colors occurring in the image.

For the color control (determination of the required mean color correction), the weights can however also be selected such that the color difference of individual pixels or colors enter into the assessment not at all or only according to their frequency. Different influence values can thereby be combined to a total weight per color element and a multitude of criteria can be used for the weighing.

A first criterium can be based on the CMYK-values (raster data combination) of the pixels, for example, on the percentage proportion of the black ink in the colored inks. If this proportion is large, the color can only be influenced by a large change in the colored inks. For such raster combinations, the weighing contribution $G_{pi}$ per pixel P can be set correspondingly smaller.

It can also be advantageous, for example, to set the weighing contribution $G_{pi}$ of the pixels with a small total surface coverage, for example, <30%, to zero, since otherwise the measurement errors for the main color deviation are unnecessarily added (in the subsequent evaluation). Furthermore, the influence of the layer thickness change and therefore their correction capability is small for such pixels.

Additionally, the weighing contribution $G_{pi}$ of those pixels which lie in inhomogeneous image regions can be selected smaller than the one of the pixels which lie in an image region of homogeneous color.

The weight $G_i$ of individual color space regions or color elements can be limited. Otherwise, a large image region of homogeneous color, for example, a homogeneously blue sky, can unduly determine the quality assessment or color correction because of the large weight of these color space regions, to the detriment of other regions.

Furthermore, the user can evaluate the image regions important for the quality assessment higher and unimportant image regions lower. The mean color errors for the more important image regions are thereby minimized at the expense of the less important image regions by way of a color correction. This can be practically realized, for example, in that the image is reproduced on a screen and the user is offered the possibility to interactively mark the regions important for the image and possibly also adjust the degree of the higher or lower evaluation.

The CMYK values of the pixels normally lie not exactly at the center of a color space region. Depending on the distance, the pixel can therefore also be assigned to several colors space regions. The assignment is thereby more exact. Preferably, the sixteen closest color space regions are selected for a full color system and the weighing contribution is distributed onto the sixteen color space regions inversely proportional to the raster distance between the pixel raster value and center raster value of the color space regions. The distributed pixel weighing sum is thereby normalized to the value before the distribution.

When a weight $G_i$ has been assigned to each color element of the test element array according to the above described criteria, these weights $G_i$ are preferably normalized to 1 so that the sum of all weights over the whole test element array, or the whole image, equals 1. The normalized weights are also referred to as relative weights $G_i$, whereby i is the index of the respective color space region $FRB_i$ or color element $FE_i$ of the test element array.

After these preparatory steps in accordance with the invention, the same steps are carried out in principle as in the already above described known processes for the color quality assessment or color control. The essential difference consist in that the (possibly relative) weights previously determined and assigned to the individual color space regions or the color elements of the test element array are incorporated into these further steps in a manner still to be described.

The image is printed together with the test element array including the color elements. The printed test element array is colorimetrically measured by way of a suitable, preferably locally scanning color measurement device and the color differences $dL_i$, $da_i$, $db_i$, $dE_i$ of the color elements $FE_i$ of the printed test element array are determined from the measured color data, relative to the set color values of the color elements $FE_i$ of the test element array which correspond to the center color values of the color space regions $FRB_i$. However, as a distinction from the known process, these color deviations are not directly used for the further steps, but rather the weighted color deviations $dL_{iw}$, $da_{iw}$, $db_{iw}$, $dE_{iw}$ which result from a multiplication of the measured color deviations $dL^*_i$, $da^*_i$, $db^*_i$, $dE^*_i$ with the weight $G_i$ previously determined for the respective color space region $FRB_i$ or the respective color element $FE_i$:

$$dL_{iw}=G_i \cdot dL^*_i$$

$$da_{iw}=G_i \cdot da^*_i$$

$$db_{iw}=G_i \cdot db^*_i$$

$$dE_{iw}=G_i \cdot dE^*_i \quad \text{(Formula 2)}$$

The three weighted color deviations $dL^*_i$, $da^*_i$, $db^*_i$ are in the following referred to as weighted color difference vector $(dF_{iw})$.

The mean weighted color difference of the whole image B is now calculated as a measure of quality by summation over all N color space regions or color elements of the test element array:

$$QL=dL_{1w}+dL_{2w}+\ldots dL_{Nw}$$

$$Qa=da_{1w}+da_{2w}+\ldots da_{Nw}$$

$$Qb=db_{1w}+db_{2w}+\ldots db_{Nw}$$

$$QE=dE_{1w}+dE_{2w}+\ldots dE_{Nw} \quad \text{(Formula 3)}$$

The determination of the measure of quality can also be carried out by way of only a partial region of the image, in that the image region of interest is interactively marked by the user and the proceeding calculations only carried out for this image region.

Tables 1a to 1c show as an example only one segment of the data of an image analysis representing only a few selected color elements. The color table according to IT8.7/3 including only 128 color elements was thereby used as test element array FT. The image N1A of ISO 300 with a total of about 2.95 million pixels was used, for example, as a base for an image to be printed.

The columns C, M, Y, K show the raster percent values (surface coverage) of the four inks for each color element with the index given in the Index column. The columns L*, a*, b*, show the (for example obtained by measurement on a reference color table) corresponding set color values of the color elements (Table 1a).

Column G shows the relative (normalized) weights $G_i$ assigned to the individual color elements. In this example, the normalized weight was set proportionally to the number of pixels in percent per color space region. The columns dL*, da*, db* show the color differences measured on the co-printed color table compared to the corresponding set color values in the columns L*, a* and b*. The column dE* shows the weighted percentage color error per color space region (Table 1b).

The columns QL, Qa, Qb and QE show the weighted means of the color differences of the 128 color elements of the color table (Table 1c). They correspond to the measure of quality for the whole image.

TABLE 1a

| Index | G [%] | C [%] | M [%] | Y [%] | K [%] | L* | a* | b* |
|---|---|---|---|---|---|---|---|---|
| 13 | 22.8 | 40 | 40 | 40 | 0 | 61.99 | 1.93 | −1.61 |
| 118 | 12.73 | 40 | 40 | 20 | 0 | 61.94 | 4.73 | −11.07 |
| 124 | 8.969 | 100 | 85 | 85 | 60 | 6.76 | −4.27 | −3.67 |
| 12 | 7.611 | 0 | 40 | 40 | 0 | 73.82 | 22.08 | 11.41 |
| 123 | 7.543 | 100 | 85 | 85 | 80 | 5.16 | −0.45 | −2.95 |
| 128 | 6.495 | 80 | 65 | 65 | 40 | 26.6 | −5.79 | 4.67 |
| 109 | 6.189 | 20 | 40 | 40 | 0 | 66.55 | 12.3 | 6.52 |
| 85 | 6.181 | 70 | 70 | 70 | 0 | 41.45 | 0.55 | 10.13 |
| 113 | 3.448 | 20 | 20 | 20 | 0 | 75.18 | 3.39 | −4.37 |
| 121 | 2.363 | 70 | 40 | 40 | 0 | 53.53 | −13.63 | −9.19 |
| 39 | 1.686 | 3 | 0 | 0 | 0 | 90.65 | 0.19 | −8.65 |
| 114 | 0 | 100 | 70 | 100 | 0 | 34.66 | −26.68 | 18.6 |
| 125 | 0 | 80 | 65 | 65 | 100 | 5.99 | −0.23 | −1.89 |

TABLE 1b

| Index | G [%] | dL* | da* | db* | dE* | dE [%] |
|---|---|---|---|---|---|---|
| 13 | 22.8 | −0.78 | −1.97 | −1.14 | 2.41 | 28.66 |
| 118 | 12.73 | −0.89 | −1.8 | −1.43 | 2.47 | 16.4 |
| 124 | 8.969 | −0.75 | −0.06 | 0.68 | 1.01 | 4.75 |
| 12 | 7.611 | −0.01 | −0.1 | 0.4 | 0.41 | 1.64 |
| 123 | 7.543 | −0.82 | 0.02 | 0.41 | 0.92 | 3.61 |
| 128 | 6.495 | −0.78 | −1.96 | −1 | 2.33 | 7.92 |
| 109 | 6.189 | −0.17 | −1.1 | −2.12 | 2.39 | 7.74 |
| 85 | 6.181 | 0.1 | −0.96 | −3.14 | 3.28 | 10.61 |
| 113 | 3.448 | −0.59 | −0.48 | 0.16 | 0.78 | 1.4 |
| 121 | 2.363 | −0.46 | −0.99 | −2.05 | 2.32 | 2.87 |
| 39 | 1.686 | 0 | 0.1 | −0.16 | 0.19 | 0.17 |
| 114 | 0 | 0.21 | −1.36 | −1.08 | 1.75 | 0 |
| 125 | 0 | −1.2 | 0.58 | −0.16 | 1.34 | 0 |

TABLE 1c

| Weighted mean | QL | Qa | Qb | QE | dE[%] |
|---|---|---|---|---|---|
| Over 128 color elements | 0.58 | 1.1 | 0.96 | 1.91 | 100 |

The further above described method, and in the following referred to as Method 1, for the assignment of the individual pixels to the individual real color space regions set by the color element of the test element array is relatively computing intensive. According to a further preferred aspect of the invention, this can be significantly simplified in that a larger number of "virtual" color space regions $VFRB_j$ is defined which evenly fill the whole CMYK colors space. For example, 65536 virtual color spaces can be set with sixteen different values each for C, M, Y and K. For each of these 65536 virtual color spaces, that real space region $FRB_i$ of the test element array is now determined into which virtual color space region (best) fits and stored in a corresponding assignment table which connects the indexes j of the virtual color space regions with the indexes i of the real color space regions. Instead of having to determine the nearest real color space region for, for example, 3 million pixels, the nearest real color space region needs to be determined only for 66553 virtual color space regions. Furthermore, this need to occur only once for a test element array.

The associated real color space region $FRB_i$ can now be very easily determined for each pixel in that the Index j of the associated virtual color space region $VFRB_j$ is first determined from the CMYK values of the pixel according to the formula $$j=(C/16)+(M/16)*16+(Y/16)*256+(K/16)*4096 \quad \text{(Formula 4)}$$

(purely integer values and operations) and then the index i of the real color space region taken from the assignment table by way of the index j. The calculations required herefor are comparatively quickly carried out. Additional quantisizing errors occur with this method. However, as far as the number of the virtual color space regions is much larger than the number of the real color space regions, they are negligible. This variation of the invention is referred to in the following as Method 2.

When the weight of a pixel is to be distributed to the adjacent color space regions, this can also be carried out with the help of a table. For example, for the four color printing, the sixteen nearest real color space regions for each virtual color space region are searched and the reference therefor stored together with the distribution coefficients. The assignment of each pixel then occurs by way of a simple and therefore quick operation, based on the tabulated data.

A further variant, referred to in the following as Method 3, consists in that an individual test element array is used for each image to be printed, the color elements of which, or the color space regions set thereby, are adapted to the respective image. A large set of, for example, 8×8×8×8=4096 "virtual" color space regions is defined therefor which evenly fill the complete CMYK-color space and the assignment of the pixels to these virtual color space regions from the CMYK-values of the pixels is carried out analog to the previous Method 2 by a simple index calculation (purely integer values and operations):

$$i=(C/32)+(M/32)*8+(Y/32)*64+(K/32)*152 \quad \text{(Formula 5)}$$

Of course, because of the space requirement and measurement effort, the test element array should not include such a large number of color elements. In practice, about 100 color elements are sufficient, insofar as they sufficiently cover the color space occupied by the image. Thus, the weights according to the previously shown criteria are initially determined for all virtual color space regions. Those, for example, 100 color space regions are then selected from the virtual color space regions which obtained the highest weight. These selected color space regions are then used as real test element array. With this method, not all pixels are normally evaluated for the quality analysis, but this can be neglected. It is an advantage that the real color space regions are optimally coordinated with the most frequent colors in the image and a real test element array with very few color elements can be selected. It is a disadvantage that an individual test element array must be defined and printed for each image.

It is described in the following how the color differences $dL^*_i$, $da^*_i$ and $db^*_i$ of the individual color elements $FE_i$ measured on the co-printed test element array can be evaluated for the color control of the printing process.

The so-called sensitivity matrix $[S_i]$ is determined in a preparatory step for each color space region $FRB_i$. These sensitivity matrixes describe (in the case of offset printing) the influence of the layer thickness differences of all inks involved in the printing process on the CIE-L*a*b*-center color value of the color space region $FRB_i$ with respect to the concrete printing process. The coefficients or elements of each sensitivity matrix $[S_i]$ consists in a known manner in the derivatives of the L*a*b*-values for the color space region $FRB_i$ of the layer thicknesses, thus, by way of the example of four inks C, M, Y and K:

$$[S_i] = \begin{pmatrix} dL^*_i/dD_C & dL^*_i/dD_M & dL^*_i/dD_Y & dL^*_i/dD_K \\ da^*_i/dD_C & da^*_i/dD_M & da^*_i/dD_Y & da^*_i/dD_K \\ db^*_i/dD_C & db^*_i/dD_M & db^*_i/dD_Y & db^*_i/dD_K \end{pmatrix} \quad \text{(Formula 6)}$$

Wherein $dD_C$, $dD_M$, $dD_Y$ and $dD_K$ represent layer thickness changes of the four inks C, M, Y and K and $dL^*_i$, $da^*_i$, and $db^*_i$ the color value difference resulting therefrom for the color space region $FRB_i$ or the color element $FE_i$.

With $[S_i]$, the known relationship applies for each color element $FE_i$ of the test element array:

$$(dF_i)=[S_i]*(dD) \quad \text{(Formula 7)}$$

Wherein $(dF_i)$ means a color difference (column) vector with the components $dL^*_i$, $da^*_i$, and $db^*_i$ and $(dD)$ a layer thickness difference (column) vector with the components $dD_C$, $dD_M$, $dD_Y$ and $dD_K$.

The determination of the sensitivity matrixes is principally known. They can be determined experimentally, in that the test element array is printed once with nominal layer thicknesses and for all inks used one each with a differing layer thickness. The measure color values at the color elements of the test element array so printed then determine the coefficients of the individual sensitivity matrixes $[S_i]$.

The coefficients of the sensitivity matrixes can also be calculated with an offset print color model. This can take place based on the full tone spectral characteristics of the inks involved and their surface coverage, in that for a preselected raster combination, the resulting spectrum is calculated and the CIE-L*a*b*color values are calculated from the spectrum. This step is repeated, whereby the layer thickness in the model calculation for each ink is increased, for example by 1%. This is carried out for all inks used and the co-efficients of the sensitivity matrixes $[S_i]$ can be calculated as in the experimental determination.

It is an essential aspect of the invention that for all color elements $FE_i$ of the (real) test element array for all color space regions $FRB_i$ the associated sensitivity matrix $[S_i]$ is determined.

In the offset printing, the inking is determined by variation of the layer thickness of the inks involved in the printing process. Thus, for the color control or color correction, those layer thickness changes (layer thickness corrections) for the inks used must be searched (calculated) which most reduce the color deviations measured on the color elements of the test element array. Since this is generally not possible simultaneously for all color elements, the layer thickness corrections are in a known manner generally searched with the prerequisite that the remaining residual color error becomes minimal over all color elements. The known methods of the compensation calculation are herefor used.

Since the layer thickness of the inks can only be evenly changed for all image positions or at least for all image positions of one printing zone, it is principally necessary that the correction is carried out according to a weighing. In accordance with the invention, the weights $G_i$ assigned to the individual color space regions or color elements i of the test element array are used herefor. For example, it does not make sense that a color error detected on the test element array is minimized when this color does not even occur in the image, which means the weight of this color region is zero. This unnecessary correction could be at the expense of the correction capability of other color space regions with a high weight portion.

In order to incorporate the weight $G_i$ of the individual color elements $FE_i$ of the test element array into the further calculations, a weighted sensitivity matrix $[S_{iw}]$ is calculated for each color element $FE_i$ according to the formula.

$$[S_{iw}]=G_i*[S_i] \quad \text{(Formula 8)}$$

In the subsequent steps, only those weighted sensitivity matrixes $[S_{iw}]$ are then used.

When the color table has N color elements, an overstated equation system results from Formula 6 and from the use of the weighted sensitivity matrixes $[S_{iw}]$ and the weighted color deviations (Formula 2) or the weighted color deviation vectors $(dF_{1w})$ formed thereby, $$(dF_{1w}) = [S_{1w}]*(dD) \quad \text{(Formula 9)}$$
$$(dF_{iw}) = [S_{iw}]*(dD)$$
$$(dF_{Nw}) = [S_{Nw}]*(dD)$$

which must be solved for the layer thickness correction vector $(dD)$ with the side condition that the (weighted) residual color error becomes minimal. When the end weighted color difference vectors $(dF_{1w}) \ldots (dF_{Nw})$ are combined to a column vector $(dF_w)$ with N*3 components and the N weighted sensitivity matrixes $[S_{1w}] \ldots [S_{Nw}]$ to a matrix $[S_w]$ with N*3 lines and 4 columns, the equation system of Formula 9 can obviously be summarized in the following matrix equation:

$$(dF_w)=[S_w]*(dD) \quad \text{(Formula 10)}$$

The matrix equation is now to be solved with the mentioned side condition $|dF_w|=\text{Min}!$ for the layer thickness correction vector $(dD)$. According to the rules of the compensation calculation, the solution therefor is given by the following equation:

$$(dD)=[[S_w]^T*[S_w]]^{-1}*[S_w]^T*(dF_w) \quad \text{(Formula 11)}$$

in which $[S_w]^T$ means the matrix transposed to $[S_w]$ and $[[S_w]^T*[S_w]]^{-1}$ means the matrix inverse to the product of the two matrixes $[S_w]^T$ and $[S_w]$. When the matrix product $[[S_w]^T*[S_w]]^{-1}*[S_w]^T$ is referred to as correction matrix $[Q]$, the solution equation for the layer thickness correction vector (dD) can be written simplified as follows:

$$(dD)=[Q]*(dF_w) \qquad \text{(Formula 12)}$$

This layer thickness correction vector (dD) is now fed into the offset printing process, which means the inking devices of the offset printing machine are set in a known manner in such a way that the desired layer thickness changes result.

With this color layer thickness correction (or an analogous printing characteristic line correction, for example, in inkjet printing) only the main image color error can be minimized, a (ideally negligible) small residual color error always remains. The (weighted) residual color error to be expected after the correction (and after its execution) calculated according to the above description can be pre-calculated as follows:

$$(\Delta F_{iw})=(dF_{iw})-[S_{iw}]*(dD) \qquad \text{(Formula 13)}$$

wherein $(\Delta F_i)$ means the residual color error vector with the components $\Delta L_i$, $\Delta a_i$ and $\Delta b_i$ for the color space region $FRB_i$. The absolute residual color error $\Delta E_{iw}$ per color space region $FRB_i$ then results according to:

$$\Delta E_{iw}=|(\Delta F_{iw})| \qquad \text{(Formula 14)}$$

The main (or more exactly total) residual color error vector $(\Delta F_w)$ results by summation over all N color space regions $FRB_i$:

$$(\Delta F_w)=(\Delta F_{1w})+(\Delta F_{2w})+\ldots(\Delta F_{Nw}) \qquad \text{(Formula 15)}$$

and finally, the total absolute residual color error $(\Delta E_w)$ is calculated by summation of the absolute residual color errors $\Delta E_{iw}$ per color space region $FRB_i$ over all N color space regions.

$$\Delta E_w=\Delta E_{1w}+\Delta E_{iw}+\ldots\Delta E_{Nw} \qquad \text{(Formula 16)}$$

The values calculated according to Formulas 14 and 15 form the color quality measure for the whole image after the execution of the calculated layer thickness correction.

Offset printing has the peculiarity that the color feed must be adapted to the printed surface. This color feed can therefore be carried out individually in regions of, for example, 3 cm widths divided according to so called printing zones. The common printing control strips therefore often have printing control elements adapted for these zones. For reasons of space constraints, one can normally not print for each printing zone a proper test element array according to the invention. The placing of a conventional printing control strip which is used in a conventional manner for the control of the zonal color homogeneity as well as an additional test element array in accordance with the invention which can also be strip-shaped and, for example, placed parallel to the conventional printing control strips is therefore advantageous according to a further important aspect of the invention. This test element array then allows an overlaid quality assessment and color regulation of the whole image.

The conventional printing control elements can also be used as color elements of the test element array. They can also be positioned mixed together with the color elements in a printing control strip. The conventional printing control elements are then repeated per printing zone or at least multiply per image width. When sufficient space is available, a test element array can be placed for each printing zone. The whole image with the size of the printing plate is divided into partial images, in this case one partial image per printing zone. These partial images are for the purposes of the proceeding description evaluated and color corrected as independent images. More practically is the division of the image into partial images with a width of, for example, 4 zones each. Upon division into partial images, one can also work with a single, small printing control strip; the color evidence of the test element array missing in the printing zones of the partial images are then taken from the printing zones of the remaining partial images.

The above described process variants are based on the CIE-L*a*b* color space. It is in accordance with the invention an equidistant color space and therefore preferable to other color spaces. If the color values are in another color space, they are preferably transformed into the CIE-L*a*b* color space before all further calculations. This can be carried out in a known manner, for example, by way of ICC-Profiles.

Instead of the whole image, any smaller image regions can also be used for the calculations (weight assignment). Unprinted image regions and regions which are only covered with text or line graphics can also be excluded from the assessment.

The above described process variants relate to the four color printing. However, they can also be used for any printing color combinations. Prerequisite is only that the test element array include a sufficient number of color elements (raster combinations) which are representative of the most important raster combinations in the image. An individual test element array can therefor be generated according to Method 3. A color space with more than four dimensions can also be used.

Standardized color tables exist, for example, from ANSI IT8.7/3 or ISO 12642. They have the advantage that they are always the same independent from the image to be printed.

The individual color tables can also be optimized to the actual image, and are required for the special color printing. A standard color table can also be combined with an individual test element array.

The color correction of the above described process variants relates purely exemplary to the layer thickness correction as is characteristic for the offset printing. For other printing processes such as, for example, inkjet printing, a layer thickness correction is not possible. However, it is possible in such printing processes to use for the color correction the printing characteristic lines of the colors involved by changing of the "dot gain". These effects can also be described by corresponding sensitivity matrixes for each color space region. Generally stated, a sensitivity matrix describes for the underlying color reproduction process in the area of the respective color space region the relationship between incremental changes of the color correction adjustments of the color reproduction process and the color value changes with respect to the assessment color space affected thereby in the color reproduction.

When the color quality is insufficient despite this correction, the color values measured on the last printed test element array can be used for a renewed color profile generation and based on the new profile the CMYK image data for the next printout can be calculated anew.

For testing purposes, the image B to be printed can be reproduced with only the colors which are included in the test element array, for example, on a screen. For this screen reproduction, the CMYK values of the individual pixels are to be replaced by the color values of the color elements to which the pixels are assigned, and these color values are to be transformed in a generally known manner into the color space (normally RGB) used for the screen representation. This screen representation allows a quick visual assessment of the "replacement colors" used for the quality measurement. The screen representation is more or less quantified depending on the number of color space regions $FRB_i$ in the test element array.

In order to carry out this image reproduction true to the weighing, a pixel can also be reproduced by a superposition of the color values of several real color space regions. The table values of the distribution core efficiency of the sixteen closest real color space regions as defined in the further above described Method 2 can be used herefor. Those are then normalized for this application so that their sum is 1. The CIA-L*a*b*-color values of the real color space regions are known and they are converted to the CIE-X-Y-Z-color values and summed-up proportional to the normalized distribution co-efficients. The sum is converted into a mean CIE-L*a*b*-color value and the latter is then transformed into a mean RGB-color value. It is to be noted that these calculations need not be carried out for each pixel, but only once for each virtual color space region.

Since the number of the virtual color space regions is much larger than the number of the real color space regions, the image reproduction with these mean color values is less quantified by of course still more than the original image, which for four colors can have a respective graduation of 256 raster values ($256^4$ colors).

The still error prone printed image, in the following referred to as Test Image PB can also be reproduced on a screen without having to measure its color values in the individual pixels. First, the corresponding CIE-L*a*b*-Color values for each pixel are determined from the original CMYK-Image data of the individual pixels. For each pixel color value one now adds from the associated (real) color space region its CIE-dL*da*db*-Color error (determined by measurement of the printed test element array). The corresponding RGB-Color values are determined from the so constructed CIE-L*a*b*-pixel color values and thereby the so constructed test image PB is reproduced. Of course, the CIE-dL*da*db*-values are also connected with the above mentioned quantifying, but since it normally represents small portions of the color value, they are not interfering.

In an analogous manner the result of the color correction determined according to the preceding description (ie the corrected test image KPB to be expected after their execution) can be recalculated and reproduced on a screen. The color correction is calculated with the help of the sensitivity matrixes for each color space region and subtracted from the color error measured on the individual color elements of the test element array (compare Formula 13). The corrected test image with the residual errors is then reproduced analogously to the uncorrected test image. It has to be considered that only the mean color error can be minimized by a color layer thickness correction (or a corresponding printing characteristic line correction during inkjet printing) and that consequently the knowledge of the residual errors is important.

Instead of the calculated one, a layer thickness correction or printing characteristic line correction intended or adjusted by the user for its effect can be illustrated in the same manner on the screen before carrying out the correction.

For better illustration of the color differences between the original image and the test image produced by the printing process, a mixed image reproduction can be chosen. For example, the image can be divided into many, for example 256 squares, each one of which is divided by a diagonal. The pixels above the diagonal are then, for example, reproduced with the test image color values and the pixels below the diagonal with the color values of the original image. For better recognition of the color differences, they can also be reproduced exaggerated by, for example a factor of 5.

Since according to the invention the images themselves need not be scanned, no (local) positioning problems between the original image data and the test image data occur as is the case in the known process of the "in-image-measurement".

For color quality assessment or color control in a color reproduction process, especially a color printing process, a test element array including several color elements is reproduced together with an image to be reproduced, whereby for the pixels of the image and the color elements of the test element array color coordinates values are present in an originating color space and for the color elements of the test element array said color values are present in an assessment color space. The co-produced test element array is calorimetrically measured, the color differences of the color elements relative to the corresponding set color values are determined from their measured color values, and a measure of color quality of the reproduced image and/or color correction quantities for the color reproduction process are calculated from the color differences of the color elements.

The original color space (AFR) is divided into a larger number of color space regions, each of which is defined by the color co-ordinate values of its center, and the test element array is assembled such that the color co-ordinate values of the color elements correspond to the color co-ordinate values of the centers of the color space regions. At least for a selected portion of the pixels of the image, for each pixel that color space region is determined as matching the center of which in the original color space has the smallest absolute distance from the respective pixel.

A weighing amount is set for each selected pixel and assigned to the respectively associated color space region. For each color space region, the weight contributions of the pixels assigned thereto are summed up to a color space weight. The color differences of the color elements determined on the test element array are respectively weighted with the color space weight of the assigned color space region.

As a measure of color quality for the reproduced image, the sum of the so weighted color differences is calculated over all color elements.

A sensitivity matrix is determined for the color control for each color space region, which for the underlying color reproduction process in the area of the respective colors space region describes the connection between incremental changes of the color correction adjustments of the color reproduction process and the color value changes with respect to the assessment color space caused thereby in the color reproduction. The color correction quantities required for the color control are calculated by way of the sensitivity matrixes of the color space regions from the determined color differences of the color elements and the color space weights of the color elements, with the proviso that the absolute value of the color deviations of all color elements of the test element array weighted with the color space weights which remain after the execution of the color correction become minimal. With the color correction quantities so obtained, the color correction is then carried out in the color reproduction process.

As will be readily apparent to those skilled in the pertinent art, the process of the present disclosure is significantly less involved than known methods (e.g., the "in-image-measurement" method), but nevertheless delivers equivalent results. Although exemplary aspects of the present disclosure have been described with reference to schematic diagrams herein, the invention is not limited thereto. Rather, the various features disclosed herein are susceptible to modification and/or variation without departing from the spirit or scope of the present disclosure.

The invention claimed is:

1. A process for color quality assessment in a color reproduction process in which a test element array including several test elements is co-reproduced with an image to be reproduced, whereby for the pixels of the image and the test elements of the test element array, color co-ordinate data in an original color space and for the test elements of the test element array said color values in an assessment color space are present, and in which the co-reproduced test element array is colorimetrically measured with respect to the assessment color space, color differences of the test elements relative to the corresponding set color values are determined from their measured color values and a color quality measure is calculated for the reproduced image from the color differences of the test elements, whereby
  (i) the originating color space (AFR) is divided into a larger number of color space areas ($FRB_i$) each of which is defined by the color co-ordinate values of its center,
  (ii) a test element array (FT) with a number of color elements ($FE_i$) corresponding to the number of color space areas ($FRB_i$) is used, whereby the color co-ordinate values of the color elements correspond to the color co-ordinate values of the centers of the color space areas,
  (iii) at least for a selected part of the pixels of the image (B) that color space area ($FRB_i$) per pixel (P) is determined as matching the center of which in the originating color space (AFR) has the smallest distance from the respective pixel (P),
  (iv) for the selected part of the pixel of the image a weighing portion ($G_{pi}$) is determined per pixel (P) for the selected part of the pixels of the image and assigned to the respectively associated color space area ($FRB_i$),
  (v) for each color space area ($FRB_i$) the thereto assigned weighing portions ($G_{pi}$) of the pixels (P) are summed up to a color space weight ($G_i$),
  (vi) the color differences ($dL^*_i$, $da^*_i$, $db^*_i$) of the color elements ($FE_i$) determined on the test element array with respect to the assessment color space (BFR) relative to the set color values are weighed respectively with the color space weight ($G_i$) of that color space area (FRB) the center color co-ordinate values of which correspond to the color co-ordinate values of the respective color element ($FE_i$), and
  (vii) as color quality measure ($Q_L$, $Q_a$, $Q_b$) the sum of the so weighted color differences ($dL_{iw}$, $da_{iw}$, $db_{iw}$) is calculated for the reproduced image over all color elements ($FE_i$) of the test element array (FT).

2. Process according to claim 1, wherein the absolute amount of the sum of the weighted color differences ($dL_{iw}$, $da_{iw}$, $db_{iw}$) is additionally calculated over all color elements ($FE_i$) as color quality measure (QE).

3. A process for the color control in a color reproduction process, in which a test element array including several test elements is co-reproduced together with an image to be reproduced, whereby for the pixels of the image and the test elements of the test element array, co-ordinate values are present in an originating color space and for the test elements of the test element array said color values are present in an assessment color space, and in which the color reproduced test element array is colorimetrically measured with regard to the assessment color space, the color differences of the test elements relative to the corresponding set color values is determined from their measured color values and color correction quantities for the color reproduction process are calculated from the color differences of the test elements, whereby
  (i) the originating color space (AFR) is divided into a larger number of color space areas ($FRB_i$) each of which is defined by the color co-ordinate values of a center,
  (ii) a test element array (FT) with a number of color elements ($FE_i$) corresponding to the number of color space areas ($FRB_i$) is used, whereby the color co-ordinate values of the color elements correspond to the color co-ordinate values of the centers of the color space area,
  (iii) at least for a select part of the pixels of the image (B) per pixel (P) that color space region ($FRB_i$) is determined as matching, the center of which has the smallest distance from the respective pixel (P) in the originating color space (AFR),
  (iv) for the selected part of the pixels of the image, a weighing portion ($G_{pi}$) is set per pixel (P) and assigned to the respectively matching color space area ($FRB_i$),
  (v) for each color space area ($FRB_i$) the weighing portions ($G_{pi}$) of the pixels (P) assigned thereto are summed up to a color space weight ($G_i$),
  (vi) a sensitivity matrix $[S_i]$ is determined for each color space area ($FRB_i$) which for the underlying color reproduction process in the region of the respective color space area ($FRB_i$) describes the connection between incremental changes of the color correction adjustments of the color reproduction process and thereby in the color reproduction effected color changes with respect to the assessment color space (BFR),
  (vii) the color correction quantities ((dD)) are calculated by way of the sensitivity matrixes ($[S_i]$) of the color space areas ($FRB_i$) from the determined color differences (($dF_i$)) of the color elements ($FE_i$) and the color space weights ($G_i$) of the color elements ($FE_i$) with the proviso that the absolute value of the sum of the after execution of the color correction remaining color differences of all color elements of the test element array weighted with the color space weights becomes minimal, and
  (viii) the color correction defined by the color correction quantities ((dD)) determined in this manner is carried out in the color reproduction process.

4. Process according to claim 3, wherein for each color space area ($FRB_i$) a weighted sensitivity matrix ($[S_{iw}]$) is formed by multiplication of the matching sensitivity matrix ($[S_i]$) with the matching color space ($G_i$), and the color correction quantities ((dD)) are calculated by way of the weighted sensitivity matrixes ($[S_{iw}]$) of the color space areas ($FRB_i$) from the determined weighed color differences ($dL^*_{iw}$, $da^*_{iw}$, $db^*_{iw}$) of the color elements ($FE_i$).

5. Process according to claim 3, wherein the calculation of the color correction quantities ((dD)) is carried out according to the methods of the equalization calculation.

6. Process according to claim 1, wherein a perceived equidistant color space, is used as assessment color space (BRF).

7. Process according to claim 3, wherein the color correction quantities are layer thickness changes ((dD)) of printing colors.

8. Process according to claim 3, wherein the color correction quantities are changes of the reproduction characteristic lines of the color reproduction process.

9. Process according to claim 1, wherein in the case of insufficient color quality, a new color profile for the color reproduction process is generated by way of the measured color values ($L^*_i$, $a^*_i$, $b^*_i$) of the color elements ($FE_i$) of the test element array (FT) and the color co-ordinate values (CMYK) of the pixels (P) of the image (B) are newly calculated based on this new profile.

10. Process according to claim 1, wherein the original color space (AFR) is divided into virtual color space areas (VFRB$_j$), the number of which is significantly larger than the number of the real color space areas (FRB$_i$), each virtual color space area (VFRB$_j$) is determined as matching to that real color space area (FRB$_i$) which best covers it and is calculated by way of the color co-ordinate values (CMYK) of the pixels (P) in which virtual color space area (VFRB$_j$) each pixel lies, and that the individual pixels (P) of the image (B) are respectively assigned to that real color space area (RFB$_i$) to which that virtual color space area (VRFB$_j$) belongs, in which the respective pixel (P) lies.

11. Process according to claim 1, wherein an individual test element array (FT) is used which is adapted to the color composition of the image (B) to be reproduced.

12. Process according to claim 1, wherein the original color space (AFR) is divided into virtual color space areas (VFRB$_j$), the number of which is significantly larger than the number of the real color space areas (FRB$_i$), it is calculated by way of the color co-ordinate values (CMYK) of the pixels (P) of the image (B) in which virtual color space area (VFRB$_j$) each pixel lies, for the pixel (P) a weight portion is determined and assigned to that virtual color space region (VFRB$_j$) in which the respective pixel lies, for each virtual color space area (VFRB$_j$) the respectively assigned weighing portions are summed up to an assigned total weight, out of the virtual color space areas (VFRB$_j$) a number of virtual color space areas (VFRB$_j$) with the largest assigned total weights corresponding in number to the real color space areas (FRB$_i$) is selected, and the selected virtual color space areas (VFRB$_j$) are used as real color space areas (FRB$_i$) and the color elements (FE$_i$) of the test element array (FT) are formed accordingly.

13. Process according to claim 1, wherein only the pixels (P) from selected image areas are used for the calculation of the color space weights (G$_i$).

14. Process according to claim 1, wherein the weight portions (G$_{pi}$) of the pixels (P) lying in the image important areas of the image (B) are selected larger than the weight portions (G$_{pi}$) of the remaining pixels.

15. Process according to claim 1, wherein the weight portions (G$_{pi}$) of the pixels (P) of the image (B) are differently selected depending on the color co-ordinate values (CMYK) of the pixels (P) in the originating color space (AFR).

16. Process according to claim 1, wherein the weight portions (G$_{pi}$) of the pixels (P) lying in inhomogenous areas of the image (B) are selected smaller than the weight portions (G$_{pi}$) of pixels lying in homogenous image areas.

17. Process according to claim 1, wherein the weight portions (G$_{pi}$) of the pixels (P) lying in large homogenous areas of the image (B) are limited.

18. Process according claim 1, wherein the weight portion (G$_{pi}$) of one pixel (P) is divided up between the matching color space area (FRB$_i$) and the color space areas most closely adjacent thereto, whereby closer color space areas obtain a larger weight portion than color space areas lying further away.

19. Process according to claim 1, wherein should the set color values of the color elements (FE$_i$) of the test element array (FT) be present in a color space other than a CIE-L*a*b*-Color space, these set color values are transformed into the CIE-L*a*b*-Color space and all further calculations are carried out in this color space.

20. Process according to claim 1, wherein in color reproduction processes with zonal color control, the image (B) to be printed is divided into a number of partial images which respectively lie in a zone or preferably in respectively a group of adjacent zones, and the color quality assessment and/or color control is carried out separately for each partial image.

21. Process according to claim 1, wherein in color reproduction processes with zonal color control, the color control is carried out in two overlapping phases, whereby in the subservient first phase independent of the image to be printed, the color homogeneity is controlled over all zones and in the overlapped second phase the actual color correction depending on the image to be printed is carried out.

22. Process according to claim 1, wherein as color reproduction process a four color, multicolor or special color printing, offset print or inkjet printing is used.

23. Process according to claim 1, wherein the image (B) to be reproduced is illustrated on a graphic display apparatus, whereby for each pixel (P) the set color values of its assigned color space area (FRB$_i$) are used for the illustration.

24. Process according to claim 1, wherein a still error prone reproduced test image (PB) is reproduced on a graphic display device, whereby for each pixel (P) from the color co-ordinate values (CMYK) of the image (B) the corresponding color values (L*,a*,b*) in the assessment color space (BFR) are determined, these color values respectively computed with the color deviations (dL*$_i$, da*$_i$, db*$_i$) measured on the color element (FE$_i$) of the test element array (FT) and the so computed color value is used for the reproduction.

25. Process according to claim 1, wherein a reproduced corrected test image (KPB) expected after execution of a color correction is reproduced on a graphic display device, whereby for each pixel (P) the corresponding color values (L*,a*,b*) in the assessment color space (BFR) are determined from the color co-ordinate values (CMYK) of the image (B), the matching color value correction values ([S$_i$]*(dD)) are determined from the calculated or manually selected color correction quantities ((dD)) by way of the sensitivity matrixes ([S$_i$]), the color values of the pixels are respectively corrected with the color differences (dL*$_i$, da*$_i$, db*$_i$) measured on the color elements (FE$_i$) of the test element array (FT) and the matching color value correction values ([S$_i$]*(dD)) are corrected and the so corrected color values used for the reproduction.

26. Process according to claim 23, wherein in the image (B) to be reproduced and the still error prone test image (PB) or the corrected test image (KPB) expected after a calculated or preset color correction are reproduced simultaneously on a graphic display device, whereby preferably the reproduction is carried out locally congruent and thereby only the pixels of the image (B) to be reproduced, or the still error prone test image (PB) or the corrected test image (KPB) are illustrated in alternating image regions.

27. Process according to claim 26, wherein the color differences between the pixels of the illustrated images (B, PB, KPB) are illustrated exaggerated.

28. Process according to claim 4, wherein the calculation of the color correction quantities ((dD)) is carried out according to the methods of the equalization calculation.

29. Process according to claim 1, wherein a CIE-L*a*b*-Color space is used as assessment color space (BRF).

* * * * *